US010783494B2

(12) United States Patent
Salomon et al.

(10) Patent No.: US 10,783,494 B2
(45) Date of Patent: Sep. 22, 2020

(54) SYSTEM AND METHOD FOR EVALUATING REGULATORY COMPLIANCE FOR A COMPANY

(75) Inventors: Felicia Salomon, Don Mills (CA); Adam Mason, Don Mills (CA); Khashayar Sajadi, Toronto (CA); Dino Skordoulis, Newmarket (CA)

(73) Assignee: REFINITIV US ORGANIZATION, LLC, New York, NY (US)

(*) Notice: Subject to any disclaimer, the term of this patent is extended or adjusted under 35 U.S.C. 154(b) by 103 days.

(21) Appl. No.: 12/111,465

(22) Filed: Apr. 29, 2008

(65) Prior Publication Data

US 2009/0089195 A1    Apr. 2, 2009

Related U.S. Application Data

(63) Continuation of application No. 10/696,571, filed on Oct. 30, 2003, now abandoned.

(30) Foreign Application Priority Data

Sep. 18, 2003 (CA) ........................... 2441516

(51) Int. Cl.
*G06Q 10/10* (2012.01)
*G06Q 40/00* (2012.01)

(52) U.S. Cl.
CPC ............. *G06Q 10/10* (2013.01); *G06Q 40/00* (2013.01)

(58) Field of Classification Search
CPC ............................... G06Q 10/10; G06Q 40/00
(Continued)

(56) References Cited

U.S. PATENT DOCUMENTS 5,664,109 A * 9/1997 Johnson ................ G06F 19/322
                                                                705/2
6,023,715 A * 2/2000 Burkes .................... G06F 17/21
                                                                715/207
(Continued)

FOREIGN PATENT DOCUMENTS

CA       2412526 A1     12/2001
CA       2415597 A1     12/2001
CA       2417863 A1      2/2002

OTHER PUBLICATIONS

Ferraiolo, David F., et al. Role-Based Access Controls. 15th National Computer Security Conference (1992). Accessed May 7, 2020 < https://patents.google.com/scholar/29118202142639842792?q=set &q=company&q=compliance&q=answers&q=user&before= priority:20030918&patents=false&scholar> entire document (Year: 1992).*

*Primary Examiner* — Tamara Griffin
*Assistant Examiner* — Shaun D Sensenig
(74) *Attorney, Agent, or Firm* — Duncan Galloway Egan Greenwald, PLLC; Kevin T. Duncan

(57) ABSTRACT

A system and method for tracking compliance of a company against a regulatory requirement. The system includes a database, an administrative module, a user entry module, a database access module, a question module, an evaluation module and a report module. The database contains records relating to the company, question information relating to the requirement, answer information and user information. The administrative module provides the company's administrative data to the database. The user entry module provides the user data to the database. The database access module determines relevant questions for the user after accessing the database. The question module provides questions to the user, accepts answers to the questions and stores the answers in the database. The evaluation module evaluates compli- (Continued)

ance by the company to the requirement after it evaluates records in the database. The report module generates a report of regulatory compliance of the company.

44 Claims, 11 Drawing Sheets

(58) Field of Classification Search
USPC .............................................. 705/1, 1.1, 500
See application file for complete search history.

(56) References Cited

U.S. PATENT DOCUMENTS

| | | |
|---|---|---|
| 6,654,737 B1 * | 11/2003 | Nunez ................................ 707/3 |
| 2001/0056398 A1 | 12/2001 | Scheirer |
| 2002/0184068 A1 | 12/2002 | Krishnan et al. |
| 2002/0198752 A1 * | 12/2002 | Stiffler ................................ 705/7 |
| 2003/0069983 A1 * | 4/2003 | Mukund ........................ 709/229 |
| 2003/0153991 A1 | 8/2003 | Visser et al. |
| 2004/0073458 A1 * | 4/2004 | Jensen ................................ 705/2 |
| 2004/0186758 A1 * | 9/2004 | Halac et al. ........................ 705/7 |

* cited by examiner

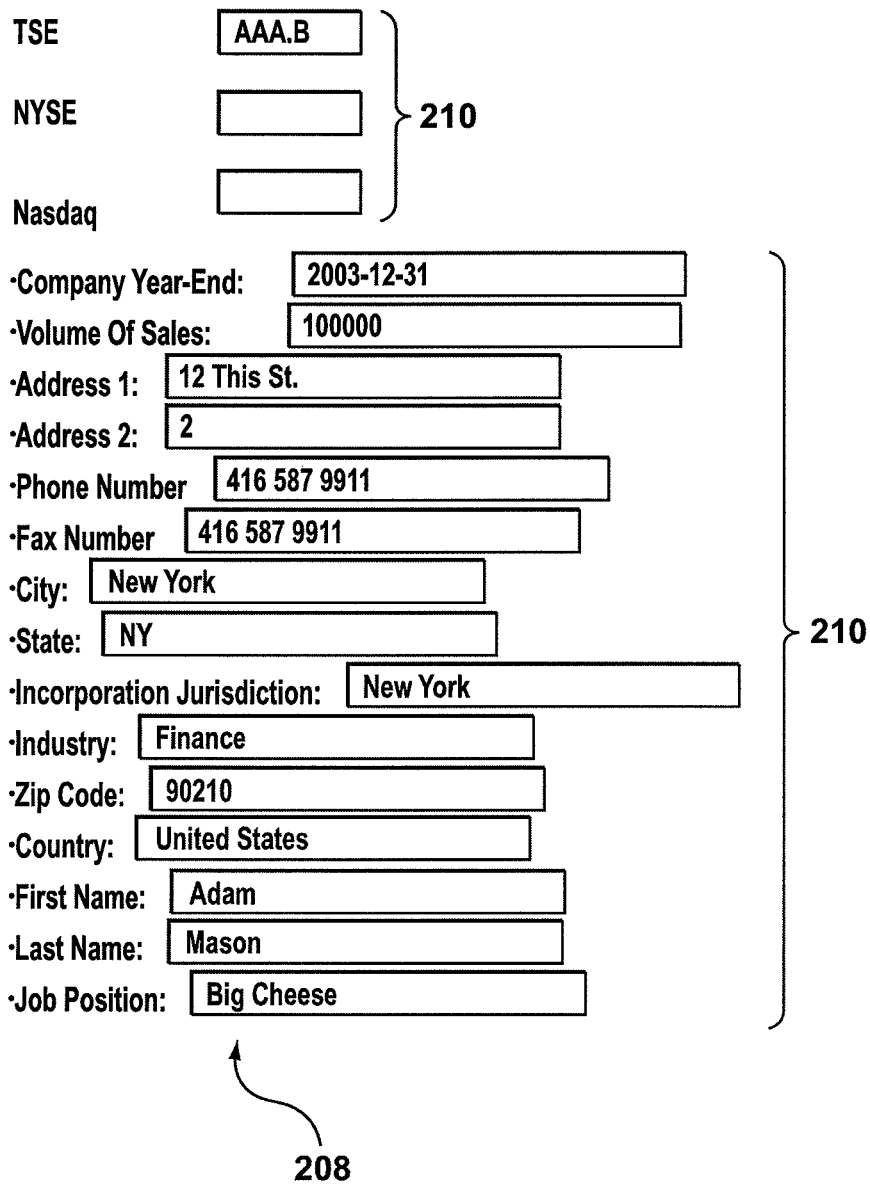
FIG. 2B(ii)

NYSE -- Audit Committee - Approval of Audit and Non-Audit Services; Prohibited Services; Tax Services ~224

Under SEC rules, the audit committee must pre-approve all permissible non-audit services and all audit, review or attestments required under the securities law. Additional SEC rules provide that the Company's primary accountant who prepares the Company's audit will not be deemed independent of the Company if it provides certain services to the Company.
This memorandum discusses the rules and regulations of the SEC mentioned above and also reviews permissible tax services.
The rules discussed herein apply to SEC regulated companies, including foreign private issuers (as defined in Exchange Act Rule 3b-4).

A. Approval of Audit and Non-Audit Services. ~236        234

226 — B. SEC Rules.

1. The SEC adopted Rule 2-01(c)(7) of Regulation S-X to implement Section 202 of the Sarbanes-Oxley Act of 2002 ("Sarbanes-Oxley") which rule requires that the audit committee pre-approve all permissible non-audit services and all audit, review or attest engagements required under the securities law (SEC Release No. 33-8183; January 28, 2003) (see Section A 5 below for definitions of the highlighted terms).

2. The Rule requires that before the accountant is engaged by the Company or its subsidiares to render the service, the engagement must be:   222
   i. approved by the Company's audit committee; or
   ii. entered into pursuant to pre-approval policies and procedures established by the audit committee of the Company, provided the policies and procedures are detailed as to the particular services, the audit committee is informed of each service, and such policies and procedures do not include delegation of the audit committee's responsiblities to   238
   management (Rule 2-01 (c)(7)(i)(A) and (B)).

228 — 3. The audit committee mat establish policies and procedures for pre-approval provided they "are detailed as to the particular service" and designed to safeguard the continued independence of the accountant.

228 — 4. One or more audit committee menbers who are independent directors may be allowed to pre-approve the service. Decisions made by the designed audit committee member(s) must be reported to the full audit committee at each of its scheduled meetings.

228 — 5. Definitions. Set forth below are the key definitions for the terms used in Rule 2-01 (c)(7) of Regulation S-X:   240

230 — i. Audit Services. The Rule recognizes that audit services are broader than those services required to perform an audit pursuant to GAAS and include services related to the issuance of comfort letters and services related to statutory audits required for insurance companies for purposes of state law as audit services.

a. Audit services also include services performed to fullfill the accountant's responsibility under GAAS.
   232 — b. In some situations, a tax partner may be involved in reviewing the tax accrual that appears in the company's financial statements; since that is a necessary part if the audit process, that activity constitutes an audit service.   242
   c. Complex accounting issues may require that the accounting firm consult with "National office" or other technical reviewers to reach an audit judgement; this activity constitutes an audit service (whether the firm separately charges for that consultation) since it is a necessary procedure used by the accountant in reaching an opinion on the finacial statements.

230 — ii. Non-Audit Services. Section 2(8) of the Act defines "non-audit services" as any professional services provided to the Company by an accounting firm, other than those

FIG. 2D

Level of Compliance Report - Governance Compliance September 4, 2003

| Control Document | Questionnaire | Question Group | Reviewed By | Status |
|---|---|---|---|---|
| NYSE -- Audit Committee - Approval of Audit and Non-Audit Services; Prohibited Services; Tax Services - 38 | NYSE -- Audit Committee - Approval of Audit and Non-Audit Services; Prohibited Services; | Approval of Audit and Non-Audit Services; | Keats, Margaret | Pending Completion |
| | | Prohibited Non-audit Services | | Pending Allocation |
| | | Financial Information Systems Design and Implementation. | | Pending Allocation |
| | | Appraisal or Valuation Services, Fairness Opinions or Contribution-in-Kind Reports. | Mason,Adam | Pending Completion |
| | | Actuarial Services. | Mason,Adam | Complaint |
| | | Internal Audit Outsourcing. | | Pending Allocation |
| | | Management Functions. | | Pending Allocation |
| | | Human Resources. | Mason,Adam | Non-Complaint |
| | | Broker-Dealer, Investment Advisor or Investment Banking Services. | Mason,Adam | Pending Completion |
| | | Legal Services. | Mason,Adam | Pending Completion |
| | | Expert Services. | | Pending Allocation |
| | | Unnamed Group | | Pending Allocation |
| NYSE -- Audit Committee - Charter Rules - 55 | NYSE -- Report On Audit Committee Charter Rules | Existing NYSE Rules | | Pending Allocation |
| | | Unnamed Group | | Pending Allocation |
| | | Proposed NYSE Rules | | Pending Allocation |
| | | Unnamed Group | Mason,Adam Mason,Daryl | Pending Completion |
| NYSE -- Audit Committee - Communication with Accountants - 32 | NYSE -- Audit Committee - Communication with Accountants | Background | | Pending Allocation |
| | | Critical Accounting Policies and Practices | | Pending Allocation |
| Column 246 | Column 248 | Column 250 | Column 252 | Column 254 |

Calender of Events

September 2003

Month September ▾  Select Year ▾

|  | Monday | Tuesday | Wednesday | Thursday | Friday | Saturday |
|---|---|---|---|---|---|---|
|  | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 Event 258 | 23 | 24 | 25 | 26 | 27 |
| 28 | 29 | 30 |  |  |  |  |

| Audit Report | | | | |
|---|---|---|---|---|
| Date: 2003-9-9 | | | | |
| Control Document | Question Group | Report Date | Reviewed By | Status |
| NYSE - Audit Committee - Approval of Audit and Non-Audit Services; Prohibited Services; Tax Services - 38 | | 2003-08-11 | Mason, Adam | Compliant |
| | | 2003-08-11 | Mason, Adam | Non Compliant |

SYSTEM AND METHOD FOR EVALUATING REGULATORY COMPLIANCE FOR A COMPANY

This is a continuation application of U.S. patent application Ser. No. 10/696,571, filed Oct. 30, 2003, the contents of which are incorporated herein by reference.

FIELD OF THE INVENTION

The invention relates to a system and method for evaluating compliance of a company to regulatory requirements, in particular, a method for a company listed on a stock exchange to evaluate its compliance to regulatory requirements for the exchange.

BACKGROUND OF INVENTION

When a company is listed on a trading exchange, such as the New York Stock Exchange (NYSE), the NASDAQ, the Toronto Stock Exchange (TSX), the FTSE or any other stock exchange, the company must comply with reporting requirements and corporate governance requirements mandated by the stock exchange in order to maintain its listing thereon. Reporting requirements may include timely filing of annual reports, quarterly reports and other reports within deadlines based on the fiscal year-end date. Governance requirements may include having a corporate policy in place regarding accounting procedures. Also, federal, state and provincial laws must be followed. Failure to comply with the requirements may lead to penalties being assessed against the company and its officers and directors. The penalties may include fines, sanctions and in an extreme scenario, removal of the company from the exchange. Further, non-compliance with the requirements may cause a loss of confidence in the stability of the company, potentially leading to a sell-off of the shares of the company and a reduction in its stock price.

As companies become larger and more diverse and as corporate filings and legal requirement change, it is becoming increasingly difficult for a corporation to ensure that it is in compliance with all the regulatory requirements of a governing body. For example, the reporting requirements under the Sarbanes-Oxley Act in the United States imposes stiff penalties for non-compliance with its reporting requirements, which are in addition to reporting requirements to the relevant exchanges. There is a need for a system which provides an evaluation of a company's efforts to comply with such requirements.

SUMMARY OF INVENTION

In a first aspect, a method for tracking compliance by a company to regulatory requirements is provided. The method comprises the following steps: defining company records relating to the company and storing company records in a database; defining questions related to requirements found in the regulatory requirements and storing the questions in the database; defining default answers related to the questions and storing the default answers in the database; assigning the questions for answering by a user at the company; receiving answers from the user and storing the answers in the database; upon request, conducting an evaluation of compliance by the company to the set of regulations by accessing the database, extracting the answers, the questions and the default answers therefrom, evaluating the answers against the default answers and determining therefrom a compliance level of the answers to the regulatory requirements; and generating a report of regulatory compliance providing the compliance level.

The method may have the compliance level being selected from one of the following levels: incomplete compliance if the answers do not contain answers for all questions in the set of questions; full compliance if the answers are complete and the answers match requirements of the default answers; and non-compliance if the answers are complete and the answers do not match requirements of the default answers.

The method may assign the questions for answering by the user by associating a title with the user and associating the title with the questions.

The method may further define control documents relating to the regulatory requirements, where the control documents provide text extracted from the regulatory requirements. The control documents may be stored in the database. Further the method may generate the report with a first link to the set of questions and a second link to the set of control documents.

The method may further track any changes made to the compliance level and, upon request, produce an audit report identifying the any changes made to the compliance level.

In the method, the company records may comprise a hierarchy of records and the questions may comprise a hierarchy of records containing the default answers. Further, the control documents may comprise a hierarchy of records and may be linked to the questions and may be linked to the companies.

The method may further, upon request, produce a calendar of events for a timeframe associated with the regulatory requirements. This may be done by accessing the database, extracting events from the database which are associated with the regulatory requirements for the timeframe and generating a calendar report of the events from the database.

In a second aspect, a system for tracking compliance of a company against a regulatory requirement is provided. The system comprises a database, an administrative module, a user entry module, a database access module, a question module, an evaluation module and a report module.

The database contains the following records: records relating to the company and other companies; question information related to the regulatory requirement including questions and default answers related to an aspect of the regulatory requirement associated with the company; a user of the system associated with the company; and other user associated with other companies. The administrative module allows entering of administrative data relating to the company and storing of the administrative data in the database in the company record. The user entry module allows entering of user data relating to the user and storing the user data in the database in the user record. The database access module accesses the database and determines relevant questions for the user utilizing the user and the company data in the database. The question module provides the questions to the user, accepts answers to the questions and stores the answers in the database. The evaluation module evaluates compliance by the company to the aspect of the regulatory requirement. It accesses the database, extracts the answers and the default answers, evaluates the answers against the default answers and determines therefrom a compliance level of the answers to the aspect of the regulatory requirement. The report module generates a report of regulatory compliance providing the compliance level.

In the system the evaluation module may determine the compliance level from a selection from one of the following levels: unassigned compliance if the user has not been entered into the system; incomplete compliance if the answers do not contain answers for all questions in the questions; full compliance if the answers are complete and the answers match requirements of the default answers; and non-compliance if the answers are complete and the answers do not match requirements of the default answers.

In the system the database may further comprise control documents relating to the regulatory requirement, providing text extracted from the regulatory requirement. Also, the report module may further produce a first link to the questions and a second link to the control documents.

The system may further comprise a module for tracking any changes made to the compliance level and for producing an audit report identifying the any changes made to the compliance level.

The system may further comprise a calendar module to produce a calendar of events for a timeframe associated with the regulatory requirement. The calendar is produced by accessing the database and extracting events from the database which are associated with the regulatory requirement for the timeframe and generating a calendar report of the events from the database.

The system may have a super user whom has access to the system. Further, the system may be responsive to requests from the super user in accepting data associated with the user and in generating the report.

In the system, the module for entering user data relating may further associate a title with the user and the module for providing questions to the user may utilize the title to identify the questions for the user.

The system may generate a report for the super user indicating a list of questions assigned to the user.

The system may provide a user with access to the system through a web-enabled computer and the super user with access through a second web-enabled computer.

In the system, the regulatory requirement may relate to a requirement for a stock exchange.

In other aspects of the invention, various combinations and subset of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 2B(ii) is a diagram of profile template screen of the web-site of FIG. 1;

FIG. 2D is a diagram of a control document screen of the web-site of FIG. 1;

FIG. 2E is a diagram of a report screen of the web-site of FIG. 1;

FIG. 2F is a diagram of a calendar screen of the web-site of FIG. 1;

FIG. 2G is a diagram of an audit report screen of the web-site of FIG. 1;

DETAILED DESCRIPTION OF THE EMBODIMENTS

Figure 1:
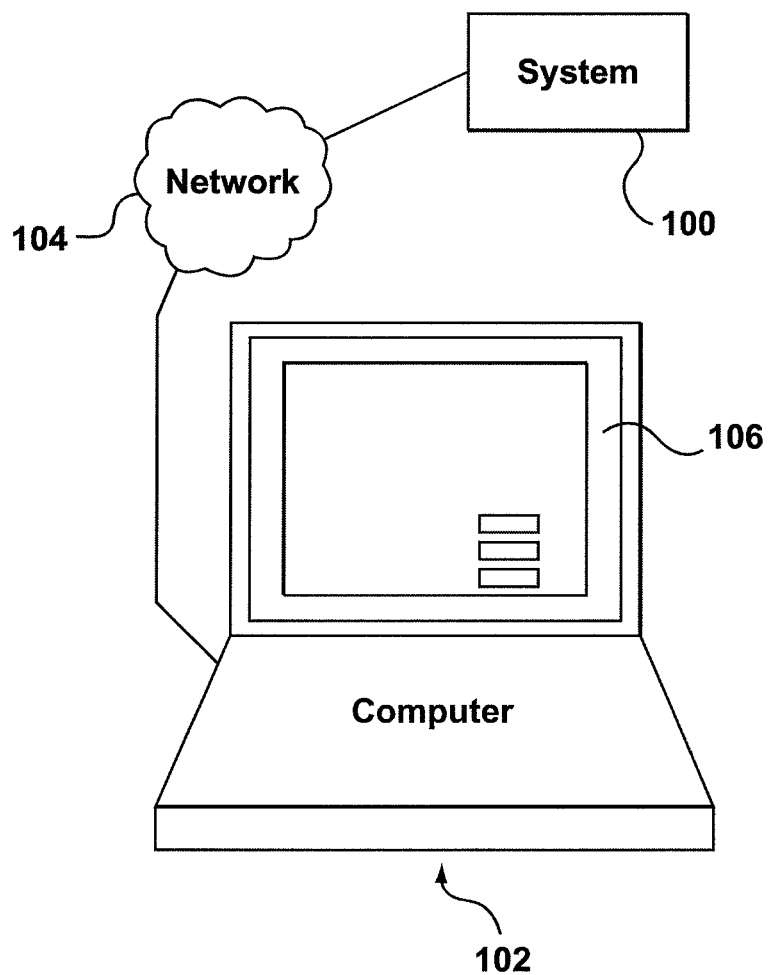
FIG. 1 is a diagram of a computer providing access to a web-site providing an interface for a user to a system embodying the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Referring to FIG. 1, the invention described herein provides a system and method for managing information relating to a company and evaluating regulatory compliance requirements, such as requirements for maintaining a listing on a stock exchange. An embodiment of the invention is system 100 which provides a web-enabled application accessed by a user of computer 102 through network 104 enabling a company to continuously monitor the status of corporate governance requirements for the company and identify and control compliance actions. As the user navigates through the application, different input screens and report screens are generated on computer 102 by the application. Exemplary input screen 106 is shown. To access system 100, the user accesses the web-site of the system by typing in its address at the command line of a web browser program operating on computer 102. Preferably, the web-site is a secure site, using secure socket layer (SSL) technologies.

At a basic level, system 100 provides access to software which provides a user with a series of predefined questions relating to specific operations of the company, its structure and its reporting activities. The answers from the user are logged in system 100 and are provided to a compliance engine which analyses the answers against identified compliance requirements. System 100 then generates a compliance report indicating areas in which the company is and is not in compliance with the compliance requirements.

To facilitate processing of questions, system 100 organizes questions into groups. For example, questions relating to financial reports may be grouped into a financial group of questions; questions relating to litigation matters may be grouped into a litigation group of questions. Each group of questions may be assigned to a different person in the company. For example, the chief financial officer (CFO) may be assigned to answer the financial group of questions and the corporate counsel may be assigned to answer the litigation group of questions.

As there is the possibility of having several persons at the company using system 100, system 100 provides different levels of access to different users. There are two types of users at the company: a super user and a "normal" user. The super user is a person whom has access to the most features of system 100 for a given company. The super user can designate whom in the company: has access to which set of questions; can monitor the status of the answers provided by the persons; and can view the reports generated by system 100. Typically, the super user is the highest-ranking person at the company, such as the Chief Executive Officer (CEO). For the purpose of system 100 described herein, the term "super user" shares some, but not all capabilities as a UNIX system administrator "super user". A "normal" user (herein simply "user") is a person at the company whom has been assigned to answer a set of questions. There are typically many users at the company. The super user can also add and delete users from system 100, assign organizational roles to users and view all answers submitted by a user. For the administration of the system, there are two types of users: an administrator and a data entry user. The administrator is the overall system administrator and has the most control over operational aspects of system 100. Typically, the administrator is an operational person who is responsible for maintaining the operation of system 100 itself. After a super user is identified, the administrator provides him with an account comprising a super user identification (ID) and password for the company. A data entry user is a person whom enter tables, charts and data relating to the questions, answers and control of system 100.

Figure 2A:
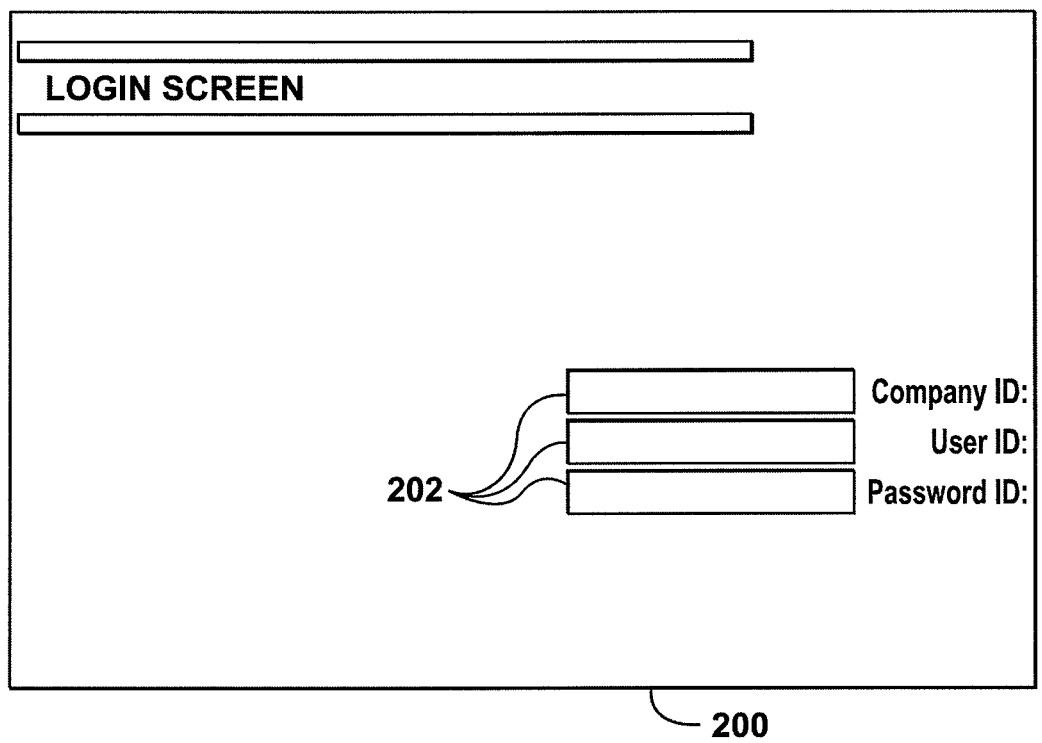
FIG. 2A is a diagram of a login screen of the web-site of FIG. 1.

Referring to FIG. 2A, when a user accesses system 100 login screen 200 of the web-site is presented wherein login prompt 202 invites the user to key in the company name, his account name and his password. In the embodiment, the account name for the super user is his email address; however other account names may be used in other embodiments. The password may be changed by the user. The generation of login screen 200 and processing of the data inputted thereto use data processing techniques and data structures well-known in the art.

Figure 2B:
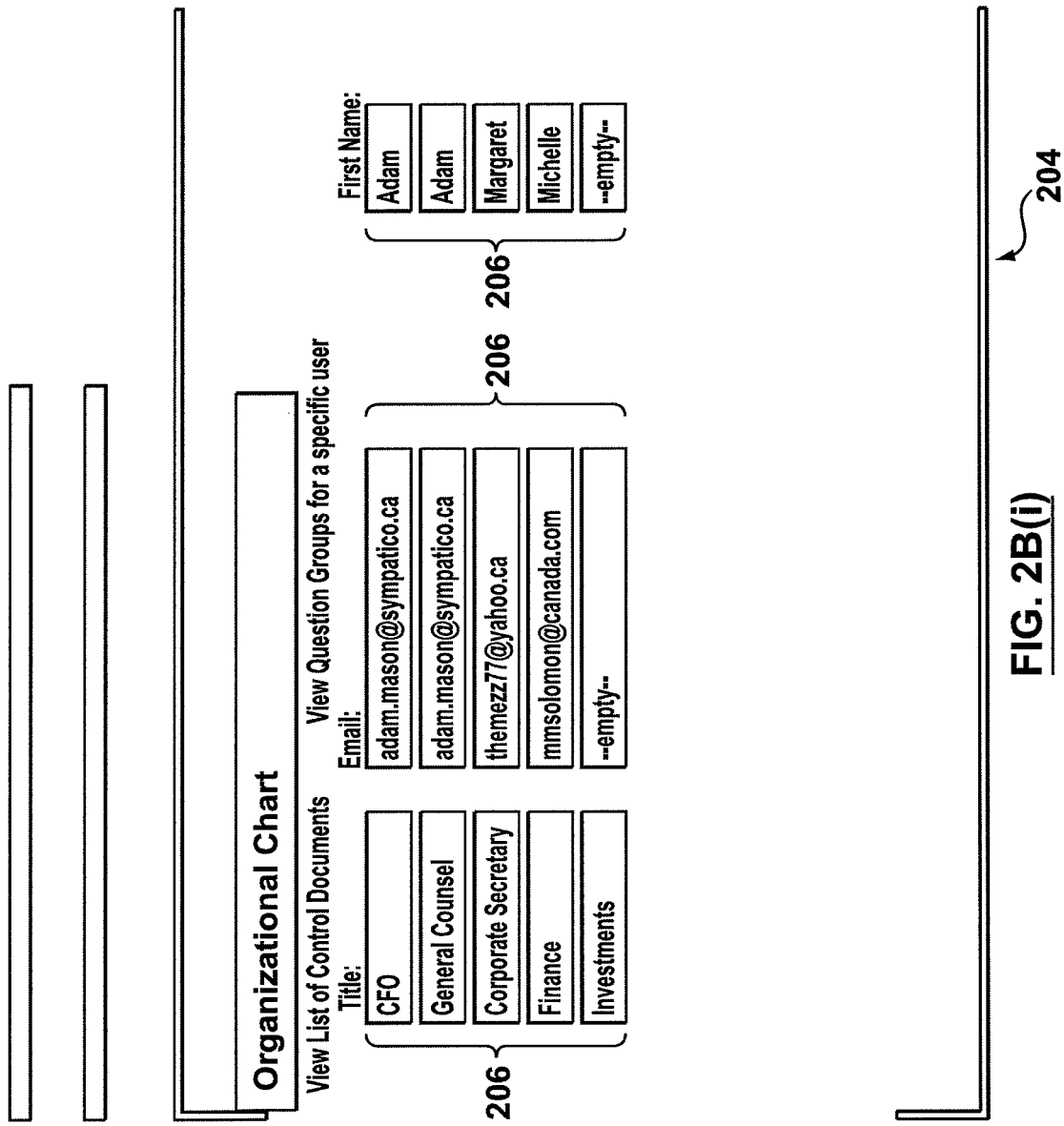
FIG. 2B(i) is a diagram of an organization template screen of the web-site of FIG. 1.

Referring to FIGS. 2B(i) and 2B(ii), in order to have system 100 evaluate a company, certain details about the operation and size of the company must be provided to system 100. This is preferably done by the super user. After the super user logs into system 100, system 100 presents an option screen to him (not shown), where organizational charts and company profiles may be completed. In FIG. 2B(i), one option allows the super user to complete template 204 for an organization chart for the company. When this option is selected, the super user is presented with template 204 allowing him to identify the CFO, the general counsel, the corporate secretary, the finance administrator and the investment administrator for the company. After users are identified fields 206 in template 204, system 100 automatically assigns certain sets of questions to certain persons in the company. Such assignments may be overridden by the super user to assign the questions to other people, as necessary. Referring to FIG. 2B(ii), super user can access profile template 208 which provides fields 210 where key administrative and organizational aspects of the company can be provided to and stored by system 100. The aspects include the fiscal year end date, the address and the exchange ticker. Such information is stored and used by the company to track filing deadlines.

Figure 2C:
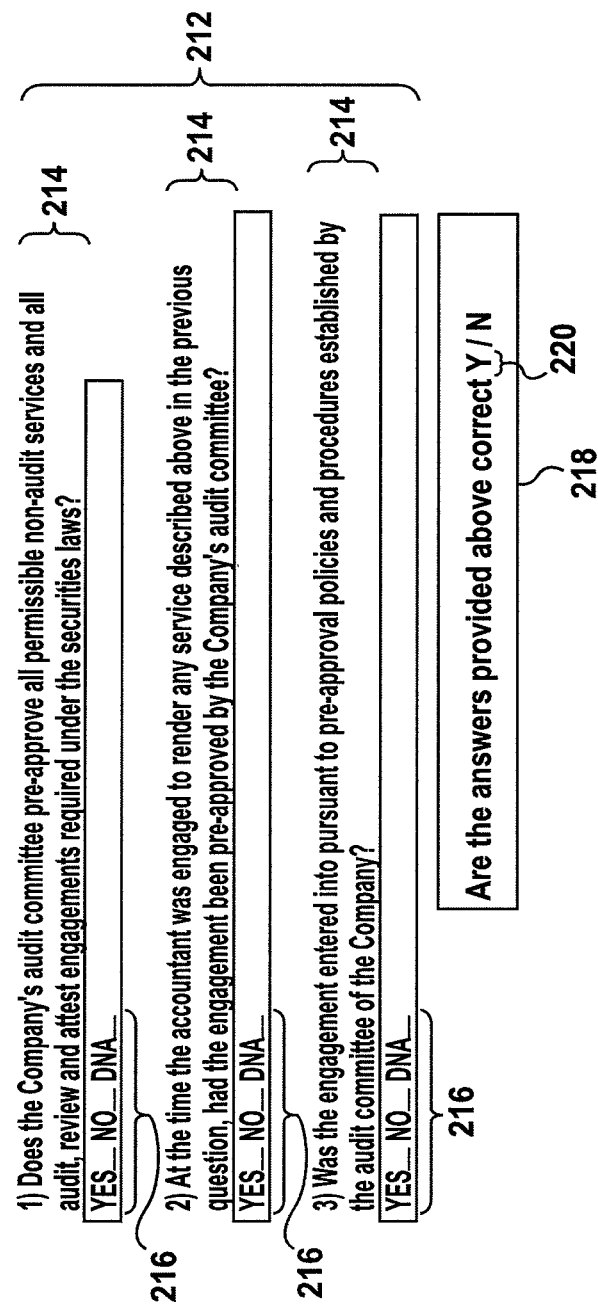
FIG. 2C is a diagram of a question group screen of the web-site of FIG. 1.

Referring to FIG. 2C, after initial administrative details about the company are provided to system 100, system 100 can be used to evaluate the compliance of the company to the related regulatory regimes. This is accomplished by having users of system 100 provide answers to compliance questions for the company. In order to facilitate processing of questions and their answers, questions are collected into groups of questions, such as exemplary question group 212. Question group 212 provides compliance questions relating to audit procedures of the company. Other question groups may relate to reporting procedures and accounting procedures for the company. These other question sets may be provided to other persons in the company for answering.

Further detail is provided on aspects of questions within question group 212. As shown, question 214 presents the user with the question:

"Does the Company's audit committee pre-approve all permissible non-audit services and all audit, review and attest engagements required under the securities laws?"

It will be seen that the phrasing of question 214 is preferably restricted to ensure that the only possible answers are provided in answer selection 216, namely only either "Yes", "No" or "Does Not Apply (DNA)". This restriction minimizes possible misunderstanding the intent of question 214 by the user and mis-keying of answers by the user. System 100 is enabled to accept an answer input from the user for each question and to record each answer against each question. In one embodiment system 100 may provide a series of "radio buttons" for each answer for selective activation by the user. A dialog box may be provided with certain questions allowing the user to elaborate on the answer provided. For example, in the dialog box, a reference may be provided to a relevant part of the company's annual report. Each question group 212 may 10 include tens of questions or more. As such, the full set of questions in question group 212 is provided to the user one screen at a time. For each screen, there is a confirmation box 218 at the bottom of the screen. Confirmation box 218 asks the user if the answers provided to the questions in the current screen for question group 212 are correct; the user must be completed with a confirmation "Yes" selection 220 to submit answers to the displayed question group 212 to system 100. Preferably, upon confirmation of the questions in the screen, the answers thereto are provided to system 100. After answers to a screen of questions in question group 212 are submitted to system 100, they are entered in to a decision matrix in a database associated with system 100 for further processing. Further detail on the decision matrix is provided below.

Further detail is provided on records used by system 100 to facilitate tracking and evaluation of answers provided by a user to questions posted by system 100. The main types of documents used to organize the questions are: control documents, questionnaires, questions groups, and help files. While the documents provide text information to the user, inherent relationships amongst parts of the documents to other documents link the documents to each other. Such links, as will be described in greater detail below, provide flexibility in associating many companies to certain control documents, many users to certain companies and various reports to various users.

Referring to FIG. 2D, each question group 212 is associated with a control document. Exemplary control document 222 provides information relating to governing regulatory provisions for the related question group 212 (FIG. 2C). Specifically, control document 222 provides exact rules, regulations and legislation for which a company must comply for the related governing body. As such, the user may review the control documents to identify how the answers are out of compliance and what corrective measures, if any, need to be taken.

It will be appreciated that control document 222, as an extract from compliance regulations or legislation, contains information and requirements in a series of structured, hierarchical levels following well-understood nested paragraphs. System 100 has a data structure which provides a template of the structure and contents of each control document in order to track and process the requirements of the control document against answers provided to questions. To assist with tracking the levels and the answers associated with them, each level is classed into a ranked level. As shown, control document 222 organizes the information into 5 levels:

1. Master level 224;
2. Section level 226;
3. Subsection level 228;
4. Paragraph level 230; and
5. Point level 232.

Each level may contain none, one or more subordinate levels thereunder. At each level, each entry at that level reflects a condition, as data, which must be complied with by the company. As such, master datum 234 are entries associated with master level 224; section datum 236 are entries associated with section level 226; subsection datum 238 are entries associated with subsection level 228; paragraph datum 240 are entries associated with paragraph level 230; and point datum 242 are entries associated with point level 232. Collectively, the datum provide all conditions which must be satisfied by the company in the control document.

Also, each control document 222 is associated with one questionnaire. In system 100, a questionnaire provides a shortened version of the relevant section of control document 222 and all of the question groups associated with the control document. The questionnaire may be viewed by a user to enable him to get an overall view of the questions in all the question groups and the regulatory provisions relating to the questions.

Also, a help file is associated with each control document, the related set of questions and the questionnaire. Each help file is accessible as an html link in the web page to assist the users to educate themselves in regard to the information contained within the control documents and avoid the complexities of dealing with the statutes, rules and regulations on their own.

Referring to FIG. 2E, returning to the description of the processing of answers to question groups 212 by system 100, contents of the control documents and the submitted answers to question group 212 are used to evaluate the compliance of the company to the related requirements in the control group. As noted earlier datum 234, 236, 238, 240 and 242 (all of FIG. 2D) in a control document 222 define conditions and standards for compliance to the control document. In system 100, those conditions and standards defined by the datum are processed by a compliance evaluator process (described in further detail below) with answers provided to the related question group 208 to produce reports summarizing the results of the compliance evaluation.

System 100 continually tracks answers to question group 212. It notifies the super user whether assigned question groups have been answered and which sets remain unanswered. The super user can initiate processing of the compliance evaluator at any time. After processing the answers through the compliance evaluator, system 100 generates several reports indicating the level of compliance for a client company. These reports will indicate whether the company is in compliance with governance requirements. Report 244 is an exemplary governance compliance report generated on the basis of existing answers provided to question group 212 to system 100. Therein, for each control document 222, an entry in column 246 is provided. For each control document entry in column 246, there is a corresponding entry for: (i) a questionnaire in column 248; (ii) a question group in column 250; (iii) a user associated with the question group in column 252; and (iv) a status report of the question group in column 254. The status report is generated by system 100.

In the embodiment, the compliance evaluation process in system 100 generates four possible statuses: "Pending Allocation", "Pending Completion", "Compliant", and "Non-compliant". A "Pending Allocation" report indicates that the question group has not been assigned to a person; the typical corrective action is that the super user will identify an appropriate person to be responsible for answering the question group. A "Pending Completion" report indicates that the question group has been assigned to a person, but that the person has not yet fully completed answering the questions therein. A "Compliant" report indicates that all of the questions in the question group have been answered by the assigned user and that all of the answers meet the requirements for the related control document. A "Non-compliant" report indicates that all of the questions in the question groups have been answered by the assigned users, but that at least one of the answers does not meet the requirements for the related control document. Corrective action may be taken to identify the question having an non-compliant answer by examining the control document for its requirements and comparing the requirements against the answers provided by the user in the question group. Administrative corrective actions, such as a change in governance policies for the company, may need to be implemented in order to allow the non-compliant answer(s) to be changed to a compliant answer. Further detail on the operation of the compliance evaluation process using the decision matrix is provided below.

Referring to FIG. 2F, system 100 has a calendar module which provides a visual tool to see deadlines in a calendar format. For example, a company listed on the NYSE must file a quarterly report on Form 10-Q (or Form 10-QSB) with the NYSE within 45 days after their fiscal quarter end. Using the year-end date provided in the set-up, system 100 monitors for completion of question groups (212, FIG. 2C) that relate to the quarterly report. If system 100 determines that the answers to the sets of questions are incomplete within a certain window of time before the deadline, then it automatically advises the super user, preferably via e-mail, of the deadline. The super user may then remind the users assigned to answer those sets of questions. In other embodiments, reminders may be generated and sent from system 100 to the users. In calendar screen 256, system 100 generates a convenient interface via a selectable monthly calendar which provides the super user with highlighted due date and events on a calendar month. On a particular day in the month, if there is a deadline for an event, such as event 258, the event is highlighted as an html link. When the super user activates the link, a page is displayed, preferably in a new window, providing information on the specific deadline and requirements associated with the event. The events are associated with question groups. As such, system 100 can determine the user associated with the question group and can then notify the super user that the user still must complete the question group in order to meet the deadline associated with the event. At that point, the super user may take whatever actions necessary (e.g. send an email reminder) to have the user answer the question group.

Referring to FIG. 2G, system 100 also provides audit report 260, which can be used to track changes made to questions and reports. In particular, for the compliance reports, the super user has the ability to override any status of any report to a different status. For example, although answers provided to the question group relating to the Audit Report may currently generate a "Non-Compliant" status report, the super user may change the status to "Compliant" for that question group. However, system 100 tracks changes made to the compliance profile for that question group in an audit trail. In particular, system 100 notes the control document, the question group, the date of the change and the identity of the super user as part of the audit trail. The audit trail provides information which may be used to support the need for "whistle blowing" provisions as required by legislation, such as the Sarbanes-Oxley Act.

It will be appreciated that system 100 provides a single point of maintenance for implementing changes to the sets of questions, the control documents and the help files. As such, updates to compliance requirements may be automatically distributed to all companies using the service for distribution to each company's affected personnel, as identified through each company's organizational chart stored in the database associated with system 100. It is preferable that maintenance of the documents be provided by qualified personnel, such as lawyers familiar with compliance requirements for a given regulatory body.

System 100 also automatically archives all system reports including audit report 260. Typically, archives are generated two weeks after the end of each quarter for each company.

To provide security, system 100 preferably utilizes secure socket layer (SSL) connectivity interfaces and encrypts the data transferred between users and system 100. Firewalls and intrusion detection system are provided to detect viruses and unauthorized access attempts to system 100.

Figure 3:
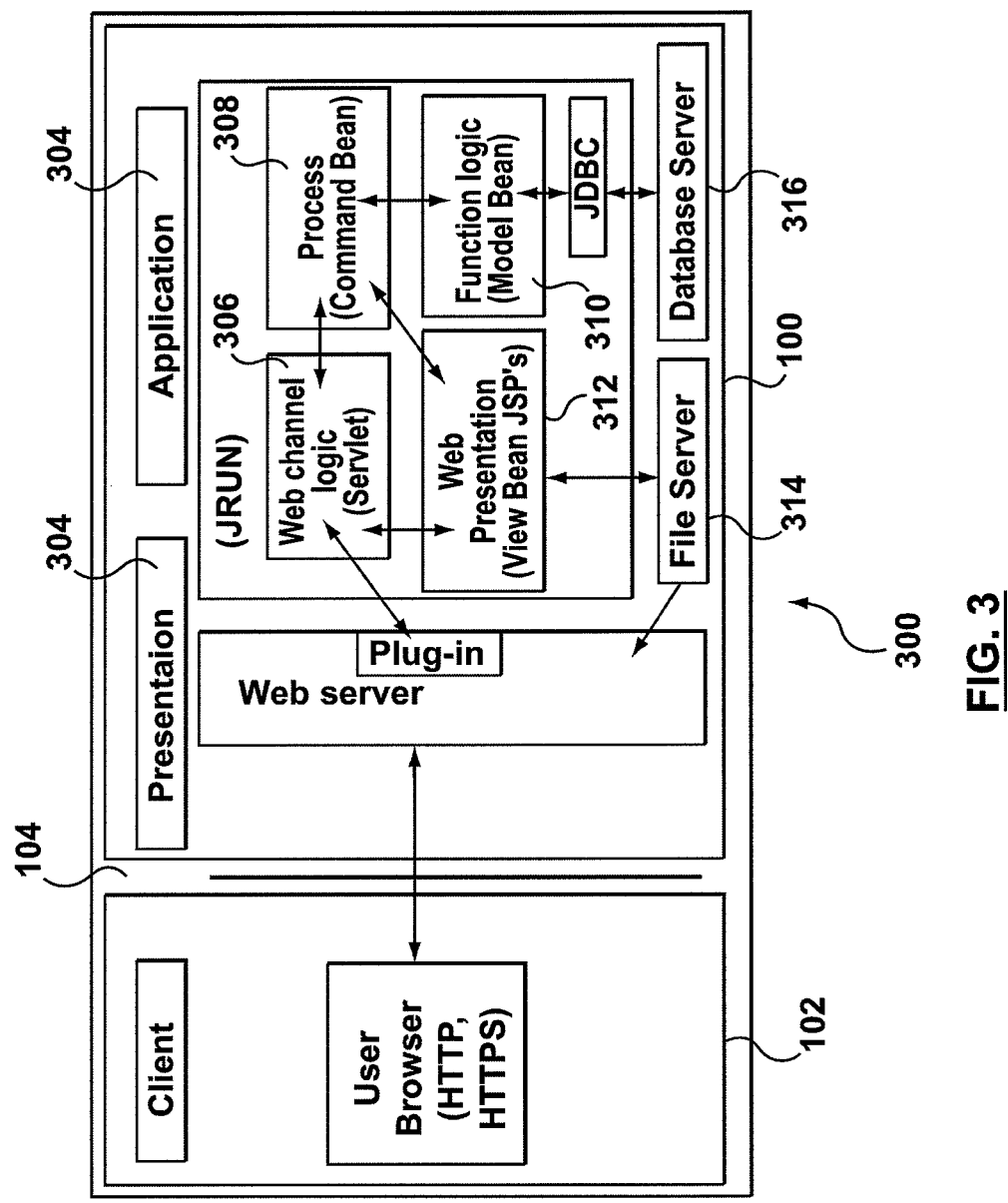
FIG. 3 is a block diagram of the system of FIG. 1.

Referring to FIG. 3, further detail on system 100 and computer 102 is provided, shown 10 generally at 300. System 100 provides a server to a series of client, such as computer 102, via connections through network 104. As such, many users at a company can access system 100 and many other users at many other companies can access system 100.

System 100 is a computer having typical elements thereon, including a processor (not shown), memory (not shown), secondary storage (not shown) and input/output devices (not shown). Software operating on system 100 provides the functional control elements to control operation thereof. In particular presentation module 302 accesses a series of templates to populate and generate the various screens produced by system 100. Application module 304 provides the main information processing and report generation modules for system 100. Application module 304 includes web channel logic servlet 306, process logic module 308, function logic module 310, web presentation module 312, file server 314 and database server 316. Elements in system 100 have a control layer utilizing using Java Servlets, JavaBeans and ResourceBundles that adhere to a modified Model-View-Controller (MVC) design.

Operation of system 100 is illustrated using an example of processing of information provided by a company. As noted before, initially, a company accesses system 100 and identifies a super user, typically the CEO. The CEO, or his agent, is responsible for populating organization template 204 and profile template 208. The information is stored in database server 316 as records.

Database server 316 accesses and maintains a database containing a series of records relating to the control documents relevant to the exchange in which the company is listed. As such, there are a series of records relating to the series of control documents, a series of records relating to the questionnaires associated with the control documents and a series of records related to the questions associated with the control records. When the users provide answers to the questions, the answers are processed by process logic module 308 against requirements dictated by the control documents. While the control documents present the text of the regulatory requirements, mapping of those requirements into computer code is provided in the compliance evaluation process which is part of processing logic module 308. The compliance evaluation process considers all possible answers from the questions and generates all possible compliance and non-compliance outcomes based on the answers provided following the Boolean logic described earlier. As such, each iterative submission of answers (on a web-page by web-page and user-by-user basis) are provided to the system and the decision matrix.

When the super user completes organization template 204, system 100 creates a record for each individual noting his title, name and email address. In system 100, the title of the person provides a predefined association to a series of question groups. For example, the CFO is associated with questions relating to financial matters. As such, an appropriate query can be generated by system 100 to access all relevant question groups for a person having a specific job title. In system 100, the super user can amend the list of questions associated with a person having a given title and can further build custom associations to questions for a person having a different title. For system 100, the identity of the user and the related company are the keys which provide links to identify the appropriate question groups to the user.

The control document also defines deadlines for reporting activities by the company. System 100 tracks deadlines based on the fiscal year end information (provided in profile template 208, FIG. 2B(ii)) associated with the company and any other hard deadlines defined from the control documents. In addition to tracking the deadlines, activities associated with the deadlines are also tracked. Further, system 100 has a mapping in which the generated deadlines are associated with the related control documents and question groups. As such, system 100 can identify deadlines for the calendar screen 256 and can identify what activities must be completed for the deadline and what persons are responsible for completing those activities. All this information is available to super user when accessing calendar screen 256.

Figure 4:
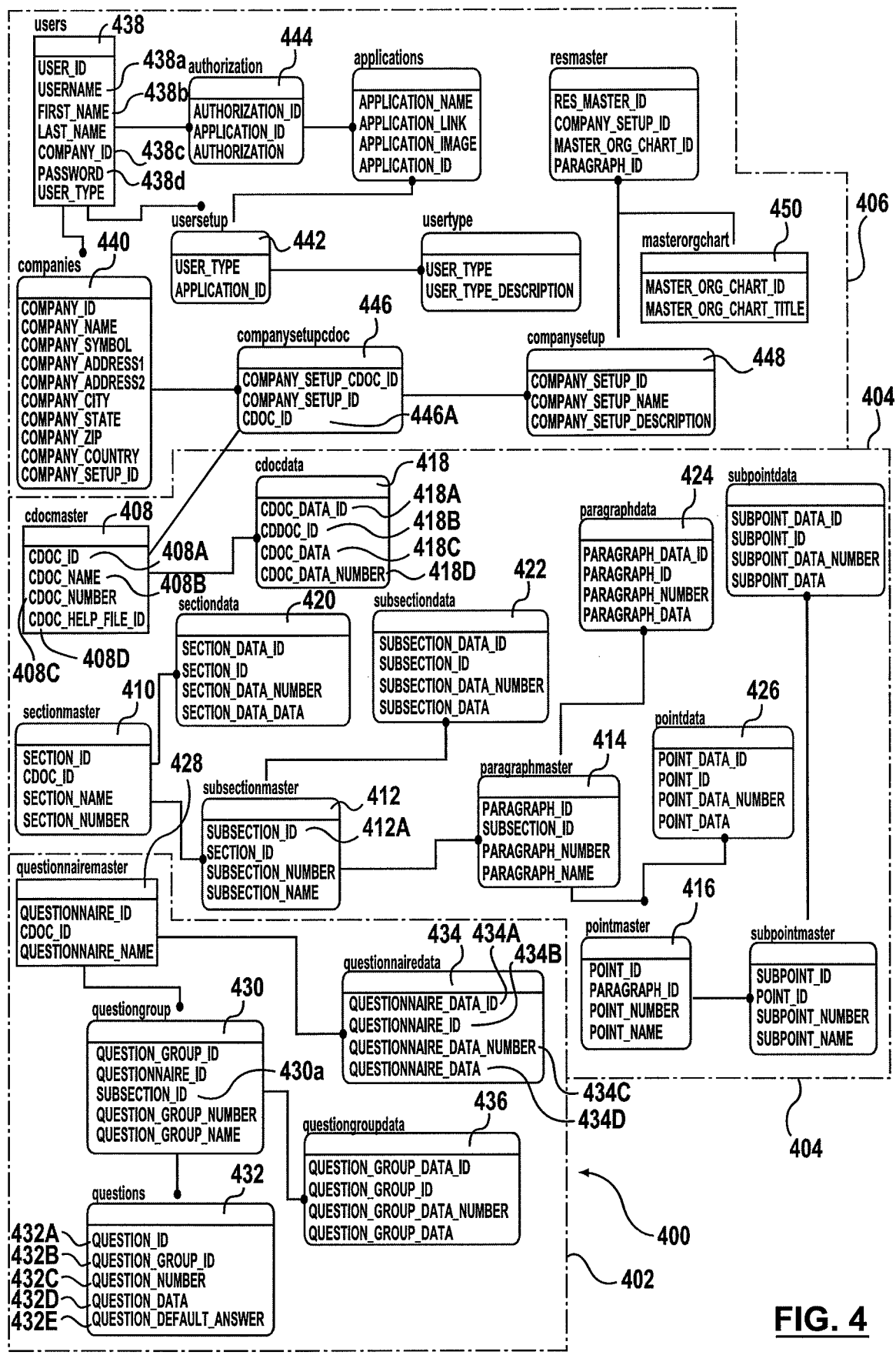
FIG. 4 is a block diagram of a data structure associated with the system of FIG. 3.

Referring to FIG. 4, further detail on the records in database server 316 is provided. Relationship chart 400 shows relationships between records structures contained within the database maintained by database server 316. Records contain information for a particular element relating to something in system 100 and they are grouped into three groups: question records 402, control document records 404 and user records 406. Question records 402 are data structures containing information about questions provided to the users. Control document records 404 contain information about control documents associated with the questions. User records 406 structures contain information about the users and their associated companies. It will be appreciated that the contents of all the records enable system 100 to assign users to questions, track answers to questions provided by users, match questions to control documents, track deadlines associated with control documents, evaluate answers provided by users, create compliance reports, and other features.

Each record contains data relating to its associated element in the group. For example, a question record contains a question ID # and a default answer. Each record may also have a link to another record. When a link is to another record of in the same group (i.e., question group, control group or user group), the link defines a hierarchical structure between the records. Records also define data associated with each level of hierarchy. Generally, a link is established between two records by having each record contain a common field therein. Links are represented in FIG. 4 by a directional line connecting a linking record to a linked record. The head of the line points to a linked record and is shown as a dot. Unless otherwise noted each link represents a 1:N relationship of "1 linking record to N linked records". While various values may be stored in each common field by many records, when two records are to be linked, the values set by system 100 for the fields are set to be identical or to other values known by system 100 to establish the link. As such, an appropriate SQL query against all records will be able to extract records having a common relationship, defined by the value in the common fields. In system 100, a level in the hierarchy is identified by having a suffix "master" in its record name; a data record is identified by having a suffix "data" in its name. Although the data structures illustrated herein are used by the embodiment to define a tree-type hierarchy of links, it will be appreciated that other hierarchical structures such as a flatter structure or a more depth-wide structure may be employed in other embodiments.

Records in one group may also be linked to records in another group, e.g. a link may be provided from a record in a question group to a record in a control group. Such a link provides a mechanism for associating information in one group to another group. For example, a question record related to a specific question is linked to a control document record related to the control document associated with the question. The link establishes a relationship in the database which reflects the relationship existing between the question and the control document.

Specifically, control document records 404 are structured as follows. Each control 10 document 222 is associated with a set of control document records 404. For the purposes of illustration, Audit Control Document 222 is abstracted to it represented control document records 404. At the head of the set of control document records 404 is a control document master record 408, relating to the master level 224 (FIG. 2B(ii)) of related control document 222. Control master record 408 has several fields therein including: ID field 408A; name field 408B; doc # field 408C; and help ID file 408D. Control master record 408 has a series of section master records 410 associated with it; each section master record relates to one section level 226 (FIG. 2B(ii)) of related control document 222. Each section master record 410 may have a series of subsection master records 412 associated with it; each subsection master record relates to one subsection level 228 (FIG. 2B(ii)) of related control document 222. Each subsection record 412 may have a series of subordinate paragraph master records 414 associated with it; each subordinate paragraph master record 414 relates to a paragraph level data 230 (FIG. 2B(ii)) of related control document 222. Each subordinate paragraph master record 414, may have a series of point master records 416 associated with it; each point master record 416 relates to a point level master record 232 (FIG. 2B(ii)) of related control document 222.

Also for each set of control document records 404, each "master" record therein may be associated with one or more corresponding data records. The data in the record contains information relating to the datum in the control document at that hierarchy level. As such, control master record 408 is associated with one control data record 418; each section master record 410 is associated with one or more section data records 420; each subsection master record 412 is associated with one or more subsection data records 422; each paragraph master record 414 is associated with one or more paragraph data record 424; and each point master 10 record 416 is associated with one or more point data records 426. Each data record typically has several fields located therein. For example, control data record 418 has several fields therein including: ID field 418A; name field 418B; and doc # field 418C.

Similarly, each questionnaire provided by system 100 has a set of question records 402 related to it. Each set of question records 402 is organized into a hierarchical data structure wherein questionnaire master record 428 is at the head. It is linked to one or more question group master records 430. Each question group master record is linked to one or more questions 432. For each "master" record, there is a link to one or more "data" records. Questionnaire master record 428 is linked to one or more questionnaire data records 434; and each question group master record 430 is linked to one or more question group data records 436. As with other records, each question record 402 typically has several fields located therein. For example, questionnaire data record 434 has several fields therein including: ID field 434A; name field 434B; and doc # field 434C.

In operation of system 100, each question group provided to a user will have an associated question group master record 428 and question group data record 434 associated with it. Further each question in each question group 436 will have a question data record 432 associated with it. Each question data record 432 has the following fields: question ID field 432A; question group ID field 432B; question # field 432C; question data field 432D; and a question default answer field 432E, which contains the expected correct answer for the question.

Each user is associated with a set of user group records 406. At the head of each set of user group records 406 is a user record 438. Fields of each user record 438 include: user ID field 438A; user name field 438B; company ID field 438C and password field 438D. Each user 10 record 438 is associated with one or more company records 440 to provide a link between a user and his company. Fields of each company record 438 include: company ID field 440A; company name field 440B; and company symbol field 440C. Each user record 438 is also associated with one or more user set-up records 442 and one or more authorization records 444. Each company record 440 is associated with one or more company set-up document records 446. Further each company set-up document record 446 is associated with one or more company set-up records 448 and each company set-up record 448 may be linked to one or more organization records 450. Organization records 450 reflect associations between titles of positions in a company and default question groups assigned to users having those titles per information provided in organization template 204 (FIG. 2B(i)).

System 100 can identify a set of questions assigned to specific users by exploiting links between question records 402 and control document records 404 and between control document records 404 and user records 406. Specifically, question records 402 are linked to control document records 404 via fields in question group records 430 and subsection master record 412. Each record has a subsection ID field: subsection ID field 430A in question group record 430, subsection ID field 412A in subsection master record 412. As such, an appropriate SQL query can be made against all question group records 430 and all subsection master group records 412 on fields 430A and 412A to identify all question groups having a connection to a particular control document, based on the contents of fields 430A and 412A. Next, user records 406 are linked to control document records 404 via fields in company setup document records 446 and control document master record 408. Each record has a Control Document ID field: CDoc ID field 446A in company setup document record 446; CDoc ID field 408A in control document master record 408. As such, an appropriate SQL query can be made against all company setup master records 440 and all control document master records 408 on fields 446A and 408A to identify all companies having a connection to a particular control document, based on the contents of fields 440A and 408A. Further, a three way link can be made between control document records 404, user records 406 and question records 402 using appropriate SQL queries which utilize the above-mentioned common fields. As such, using the above described data structure, system 100 can track a series of companies having different company types on different stock exchanges, a series of control documents for various listings and a series of questions for each of the control document in the database. Using the relationships amongst the records system 100 can identify: specific companies on specific exchanges, control documents for specific audit questions for specific exchanges and questions related to those specific control documents. As such, a user at a specific company can be linked to a specific control document and a specific question from all records in the database. It will be appreciated that other data structures and linkages amongst records containing information about companies, questions and requirements may be provided to accomplish a similar task.

Aspects of operation of system 100 are further illustrated with the following example wherein a CFO at Company X, which is listed on the TSE has been assigned to answer Audit Questions by the CEO.

Therein, the CFO accesses the web-site of system 100 from his office and signs on through login screen 200 (FIG. 2A). The CFO is presented with a screen showing all of the question groups which were assigned to him by the CEO. Corresponding to each question group, there is an html link to the associated control document, which he may review to see what 10 regulations underlie the question group. He activates the link for the Audit Report and Question Group 208 is presented to him (FIG. 2C). For question group 208, questions are provided to him in a series of screens. After he has provided answers to each of the questions on one screen, he completes confirmation box 218 with a "Y". At that point, all answers for the questions for that screen are provided to system 100. As noted above answers are stored in a decision matrix in the database in database 316. Also, each question provided to the CFO is associated with a question record 432. As such, each question record 432 provides links to the associated question group data record 436 and the associated questionnaire. For the example, it is presumed that the CFO answers all questions in question group 208 presented to him.

Next, the CEO accesses system 100 from his office through login screen 200 and actively reviews the status screen of reports generated by system 100 for Company X. In the report screen, system 100 allows the CEO to choose which report he wishes to have generated, either: an organizational compliance report, an internal compliance report or an audit compliance report. The CEO selects the audit compliance report.

Thereafter, system 100 is initiated to evaluate the compliance of Company X to the requirements of the Audit Report, based on the information in the database in database server 316 at that time. As the database includes records of all companies and all users of all companies whom have access to system 100, system 100 access the following information therein about Company X and its users: the company ID, the user IDs and the Company type. Requesting an Audit Compliance Report also generates a cookie for system 100, identifying the type of report being requested. As noted earlier, the user and company information are keys 10 which are used to identify the appropriate control documents and question groups for the company and the user. As several companies in several jurisdictions may be using system 100 contemporaneously, there may be multiple control documents covering audit controls for different jurisdictions. From the information relating to the company, the user and the report, system 100 derives the following information from records in the database by providing appropriate SQL queries against the known structures of the records in the database:

Control master records 408 associated with a company type;

Question Group master records 428 associated with the control master records 408

Users associated with the question group master records 428;

Question data records 436 associated with group master records 428;

Default answers within each question data record 436;

Answers provided by users; and

Status of question groups associated with the users.

From the queries, an answer data structure is created which contains the following entries gathered from all entries in the database meeting the above criteria:

Control Document: Question Group: Question Group Status: Question: Answered by: Answer: Default Answer The data in the answer data structure is then sorted by the entries in the Question Group Field.

Next, to determine generate a compliance report, a compliance evaluation process in system 100 then evaluates the entries in the answer data structure against the following criteria:

If Answer !=Default Answer && Question Group Status=Complete Then Answers to Question Group are Non-Compliant Else If Answer-Default Answer && Question Group Status=Complete Then Answers to Question Group are Non-Compliant Else If Question Group Status=Incomplete Then Question Group is Pending Completion Else If Question Group Status=Pending Allocation Then Question Group is Pending Allocation If necessary, the evaluation is repeated for all questions of assigned to that user. If compliance to another larger issue requires additional answers from other question groups (whether or not from the same user), then appropriate nested extractions from the database may be accomplished and subsequent evaluations made.

Using the results of the evaluation, a summary of all governance reports is generated by system 100 and is provided in a series of reports, such as exemplary Compliance Governance Report 244. As answer data structure contains information relating to the control document, question group and user, report 244 produces for any question group, the report provides a row of data containing an indication of a question group, its compliance status (Pending Completion, Pending Allocation, Compliant, Non-compliant), the user assigned to question group, the related questionnaire and the related control document. The indications are provided as html links. As such, if a report is "Non-compliant", the CEO can access the related control document through its html link to view the associated control document 222. The CEO may also send an email to the user to initiate remedial action for the non-compliant report.

Next, if the CEO wishes to view up-coming calendar event, he returns to the main menu and selects the "calendar" option. As noted before, calendar screen 256 (in FIG. 2F) is provided to him, enabling him to request a specific month calendar for viewing. Once the month is selected, the system accesses the database controlled by database server 316. Based on the user (the CEO), the company (Company X) the requirements defined in the control documents and the selected month, system 100 generates a SQL query against the database to identify all notable events within the selected month. System 100 processes the results and generates a user-friendly 10 calendar format, presenting any event as an html link in the calendar. Activation of the link will generate a further screen indicating the reasons for the event and the users in the system responsible for completing reports associated with the event. At this time, the super user may override any status of any report, e.g. changing a "non-compliant" report to "compliant". All changes are tracked and noted in the audit report.

Another feature of system 100 provides the CEO with a screen where he can review the current status of all reports. When the status screen is accessed, system 100 uses a SQL query to generate a data structure based on the company name to find all users associated with the company and all the question groups related to the company. From the entries in the resultant data structure, system 100 generates a screen indicating the question group, its related questionnaire and the status the answers in the question group (e.g. whether the question group has been assigned to a user or completed by a user).

It will be appreciated that using the database, appropriate links amongst users, question groups, help files, control documents, answers and deadlines associated with companies may be generated by providing appropriate queries to the database. Once the required set of records is extracted from the database, the reports can be provided as screen reports to the super user and the users.

It will be appreciated that in other embodiments, other relationships amongst question groups, answers and control documents can be provided. In one exemplary other relationship, the logic requirements contained in the control documents may be hardcoded into a processing module in the other embodiment.

It is noted that those skilled in the art will appreciate that various modifications of detail may be made to the present embodiment, all of which would come within the scope of the invention.

What is claimed is:

1. A system for evaluating compliance of a company of a plurality of companies against a regulatory requirement, said system comprising:
   a relational database containing records and links defining a hierarchical structure of interconnections within the database including:
   a company record for said company;
   a set of question records related to said regulatory requirement, said set of question records including a plurality of groups of questions and a set of default answers related to said regulatory requirement, each group of questions relating to a different company procedure and being automatically assigned to an individual of said company who is responsible for compliance requirements relating to the associated company procedure;
   a set of control documents, a first set of links linking each control document with one or more different groups of questions in the database and comprising information that at least comprises extracts from regulatory provisions that govern the associated company procedure and an overview of the questions in the group and of the regulatory provisions, and each control document being an electronic record and structured in a set of levels, wherein each level is associated with one of the plurality of groups of questions and one or more answers in the set of default answers;
   a master record, the master record comprising a nested set of records wherein each nested record in the nested set of records is associated with a subset of data in a separate data record and is linked with one level from the set of levels for each control document in the set of control documents by a second set of links in the database, each nested record in the set of nested records linked with a nested record in a higher nested layer and a nested record in a lower nested layer in the set of nested records, the master record adapted to, by a set of fields in the master record, link and facilitate management and tracking of the associations of the set of levels, the groups of questions, and the one or more answers in the set of default answers for each control document;
   a user record for each individual user of said system associated with said company; and
   other user records for other users associated with said other companies;
   a module for entering administrative data relating to said company and storing said administrative data in said database in said company record;
   a module for entering user data relating to each individual user and storing said user data in said user record;
   a module for accessing said database and for determining the group of questions assigned to each individual user, the module further configured to store an indication of the assigned questions in a corresponding user record;
   a module for presenting each group of questions to the assigned individual user, for accepting answers to each group of questions and for storing said accepted answers in said database, the module further configured to associate the answers to each group of questions with a corresponding user record;
   a module for evaluating compliance by said company to said regulatory requirement by accessing said database, extracting said accepted answers and said set of default answers, generating an answer data structure comprising a sorted set of information derived in part by executing a set of queries on said database, evaluating said answer data structure against said set of default answers, and determining therefrom a compliance level of said regulatory requirement; and
   a module for generating a report of regulatory compliance based on said compliance level,
   wherein said module for evaluating compliance determines said compliance level by selecting said compliance level from one of the following levels: unassigned compliance when an assigned individual has not been entered into said system; incomplete compliance when said accepted answers do not contain answers for all questions in said plurality of groups of questions; full compliance when said accepted answers are complete and said accepted answers match requirements of said default answers; and non-compliance when said accepted answers are complete and said accepted answers do not match requirements of said default answers.

2. The system as claimed in claim 1, wherein said module for generating a report further produces a first selectable link to said set of question records in said database and a second selectable link to said set of control documents in said database.

3. The system as claimed in claim 2, wherein said system further comprises a module for tracking any changes made to said compliance level and producing an audit report identifying changes made to said compliance level.

4. The system as claimed in claim 3, wherein said system further comprises a module to produce a calendar of events for a timeframe associated with said regulatory requirement by accessing said database and extracting events from said database which are associated with said regulatory requirement for said timeframe; and to generate a calendar report of said events from said database.

5. The system as claimed in claim 4, wherein a super user has access to said system and said system is responsive to requests from said super user to generate said report.

6. The system as claimed in claim 5, wherein said system generates a report for said super user indicating the group of questions assigned each individual.

7. The system as claimed in claim 6, wherein each individual user accesses said system through a web-enabled computer associated with each individual user and said super user accesses said system through a second web-enabled computer.

8. The system as claimed in claim 7, wherein said regulatory requirement relates to a requirement for a stock exchange.

9. The system as claimed in claim 1, further comprising a module for automatically generating a link between two or more of the one or more control documents, the first grouping of questions, the first unique user record, and the first set of answers.

10. A method of evaluating compliance by a company to a set of regulatory requirements using a computerized system that communicates with at least one client computer, said method comprising:

at the computerized system, storing a set of company records relating to said company in a relational database containing records and links defining a hierarchical structure of interconnections within the database;

at the computerized system, storing a set of questions related to requirements found in said set of regulatory requirements in said relational database;

at the computerized system, dividing the set of questions stored in said relational database into groups, each group of questions relating to a different company procedure;

at the computerized system, automatically assigning each group of questions to an individual of said company who is responsible for compliance requirements relating to the associated company procedure;

at the computerized system, linking a level in a control document by a first link in the database, the control document being an electronic record and comprising a set of levels and being stored in said relational database, with one or more groups of questions and with one or more answers a set of default answers, each control document comprising information that at least comprises extracts from regulatory provisions that govern the associated company procedure and an overview of the questions in the group and of the regulatory provisions;

at the computerized system, storing the set of default answers related to said set of questions in said relational database;

at the computerized system, storing a master record, the master record comprising a nested set of records wherein each nested record in the set of nested records is associated with a subset of data in a separate data record and is linked with one level from the set of levels for each control document in the set of control documents by a second set of links in the database, each nested record in the set of nested records linked with a nested record in a higher nested layer and a nested record in a lower nested layer in the set of nested records, the master record adapted to, by a set of fields in the master record, link and facilitate management and tracking of the associations of the set of levels, the groups of questions, and the one or more answers in the set of default answers for each control document;

at the at least one client computer, for each individual, displaying the assigned group of questions and information of the associated control document and receiving answers to the questions of the group;

transmitting the received answers from the at least one client computer to the computerized system for storage in said relational database;

at the computerized system, accessing said relational database and extracting therefrom said received answers, said set of questions and said set of default answers, and storing an indication of the assigned group of questions and received answers with a corresponding user record;

at the computerized system, generating an answer data structure comprising a sorted set of information derived in part by executing a set of queries on said relational database, evaluating said answer data structure against said default answers and determining therefrom a compliance level to said set of regulatory requirements; and generating an electronic report of regulatory compliance of said company based on said determined compliance level, wherein said compliance level is determined by selecting a compliance level from one of the following levels: incomplete compliance when said received answers do not contain answers for all questions in said set of questions; full compliance when said received answers are complete and said received answers match requirements of said default answers; and non-compliance when said received answers are complete and said received answers do not match requirements of said default answers.

11. The method as claimed in claim 10, wherein said automatically assigning each group of questions to an individual of the company is based on the title of the individual in the company.

12. The method as claimed in claim 11, wherein said electronic report further comprises a first user selectable link to said set of questions stored in the computer database and a second user selectable link to said control documents stored in the computer database.

13. The method as claimed in claim 12, further comprising:

tracking any changes made to said compliance level; and generating an electronic audit report identifying changes made to said compliance level.

14. The method as claimed in claim 13, wherein said set of company records comprises a hierarchical arrangement of records, said set of questions comprises a hierarchical arrangement of records containing said set of default answers, and said control documents comprise a hierarchical arrangement of records.

15. The method as claimed in claim 14, further comprising:
generating an electronic calendar of events for a timeframe associated with said set of regulatory requirements by accessing said computer database and extracting events from said computer database which are associated with said set of regulatory requirements for said timeframe; and
generating an electronic calendar report of said events from said computer database.

16. The method as claimed in claim 10, wherein said storing a set of company records comprises completing a template identifying individuals responsible for different company departments and wherein said automatically assigning comprises assigning the groups of questions to the individuals identified in said template.

17. The method as claimed in claim 16, wherein said storing a set of company records further comprises completing a profile template identifying filing deadlines specified by said regulatory requirements.

18. The method as claimed in claim 16, wherein said electronic report further comprises a first user selectable link to said set of questions stored in the computer database and a second user selectable link to said control documents stored in the computer database.

19. The method as claimed in claim 16, further comprising:
tracking any changes made to said compliance level; and
generating an electronic audit report identifying changes made to said compliance level.

20. The method as claimed in claim 19, further comprising:
generating an electronic calendar of events for a timeframe associated with said set of regulatory requirements by accessing said computer database and extracting events from said computer database which are associated with said set of regulatory requirements for said timeframe; and
generating an electronic calendar report of said events from said computer database.

21. The method as claimed in claim 16, wherein said different company procedures at least comprise a reporting procedure and an accounting procedure.

22. The method as claimed in claim 10, wherein the information of each control document further comprises general information describing the regulatory provisions.

23. The method as claimed in claim 10, the method further comprising at the computerized system, automatically generating a link between two or more of the one or more control documents, the first grouping of questions, the first unique user record, and the first set of answers.

24. A system for evaluating compliance of a company against a regulatory requirement, said system comprising:
a relational database containing records and links defining a hierarchical structure of interconnections within the database and storing:
a company record;
a set of question records related to said regulatory requirement, said set of question records including a plurality of groups of questions and a set of default answers related to said regulatory requirement, each group of questions relating to a different company procedure and being assigned to an individual of said company who is responsible for compliance requirements relating to the associated company procedure;
a set of control documents, a first set of links linking each control document with one or more different groups of questions in the database and comprising information that at least comprises extracts from regulatory provisions that govern the associated company procedure and an overview of the questions in the group and of the regulatory provisions, and each control document being an electronic record and structured in a set of levels, wherein each level is associated with one of the plurality of groups of questions and one or more answers in the set of default answers;
a master record, the master record comprising a nested set of records wherein each nested record in the nested set of records is associated with a subset of data in a separate data record and is linked with one level from the set of levels for each control document in the set of control documents by a second set of links in the database, each nested record in the set of nested records linked with a nested record in a higher nested layer and a nested record in a lower nested layer in the set of nested records, the master record adapted to, by a set of fields in the master record, link and facilitate management and tracking of the associations of the set of levels, the groups of questions, and the one or more answers in the set of default answers for each control document; and
processing structure configured to:
store data relating to said company in said company record;
assign each group of questions to an individual of said company;
present each group of questions to the assigned individual together with information of the associated control document, accept answers from the assigned individual and store said accepted answers in said database;
store an indication of the assigned groups of questions and accepted answers in a corresponding user record;
generate an answer data structure comprising a sorted set of information derived in part by executing a set of queries on the relational database;
evaluate said answer data structure against said set of default answers, to determine a compliance level of said regulatory requirement by selecting a compliance level from one of the following levels: incomplete compliance when said accepted answers do not contain answers for all questions in said plurality of groups of questions; full compliance when said accepted answers are complete and said accepted answers match requirements of said default answers; and non-compliance when said accepted answers are complete and said accepted answers do not match requirements of said default answers; and
generate a report of regulatory compliance based on said compliance level.

25. The system as claimed in claim 24, wherein said report comprises a first selectable link to said set of question records in said database and a second selectable link to said set of control documents in said database.

26. The system as claimed in claim 24, wherein said processing structure is further configured to track changes made to said compliance level and to produce an audit report identifying changes made to said compliance level.

27. The system as claimed in claim 26, wherein said processing structure is further configured to produce a calendar of events for a timeframe associated with said regulatory requirement by accessing said database and extracting events from said database which are associated with said regulatory requirement for said timeframe and to generate a calendar report of said events from said database.

28. The system as claimed in claim 24, wherein said regulatory requirement relates to a requirement for a stock exchange.

29. The system as claimed in claim 28, wherein said different company departments at least comprise a legal department and an accounting department.

30. The system as claimed in claim 29, wherein said processing structure is configured to store a completed template identifying individuals responsible for different company departments and to assign the groups of questions to the individuals identified in said completed template.

31. The system as claimed in claim 30, wherein said processing structure is configured to store a completed profile template identifying filing deadlines specified by said regulatory requirements.

32. The system as claimed in claim 31, wherein the information of each control document further comprises general information describing the regulatory provisions.

33. The system as claimed in claim 24, wherein said processing structure is configured to store a completed template identifying individuals responsible for different company departments and to assign the groups of questions to the individuals identified in said completed template.

34. The system as claimed in claim 33, wherein said processing structure is configured to store a completed profile template identifying filing deadlines specified by said regulatory requirement.

35. The system as claimed in claim 33, wherein the information of each control document further comprises general information describing the regulatory provisions.

36. The system as claimed in claim 24, the processing structure further configured to automatically generate a link between two or more of the one or more control documents, the first grouping of questions, the first unique user record, and the first set of answers.

37. A computer-implemented method for evaluating compliance of a company against a set of regulatory requirements, said method comprising:
linking by a computer a set of questions with one or more control documents by a first set of links in a relational database containing records and links defining a hierarchical structure of interconnections within the database, each control document stored in the relational database and being an electronic record structured in a set of levels, wherein each level is associated with one or more of the questions from the set of questions and one or more answers in a set of default answers;
generating by a computer a master record, the master record comprising a nested set of records wherein each nested record in the nested set of records is associated with a subset of data in a separate data record and is linked with one level from the set of levels for each control document in the set of control documents by a second set of links in the relational database, each nested record in the set of nested records linked with a nested record in a higher nested layer and a nested record in a lower nested layer in the set of nested records, the master record adapted to, by a set of fields in the master record, link and facilitate management and tracking of the associations of the set of levels, the set of questions, and the set of default answers for each control document;
automatically assigning by a computer a first grouping of questions from the set of questions to a first unique user record based on a first set of information associated with the first unique user record;
presenting the first grouping of questions via a display associated with the first user record;
receiving by a computer a first set of answers to the first grouping of questions, the first set of answers being associated with the first unique user record in response to presenting;
storing an indication of the assigned first grouping of questions and the first set of answers with a corresponding user record;
generating an answer data structure comprising a sorted set of information derived in part by executing a set of queries on said relational database,
comparing by a computer the answer data structure to a first set of default answers associated with the first grouping of questions;
determining by a computer a compliance level to the set of regulatory requirements based on the comparing step;
generating by a computer an audit report based at least in part on the compliance level; and
transmitting by a computer the audit report.

38. The computer-implemented method of claim 37 further comprising automatically assigning by a computer a second grouping of questions from the set of questions to a second unique user record based on a set of information associated with the second unique user record.

39. The computer-implemented method as claimed in claim 37, further comprising:
tracking any changes made to said compliance level; and
generating a new audit report identifying changes made to said compliance level.

40. The method as claimed in claim 37, the method further comprising automatically generating a link between two or more of the one or more control documents, the first grouping of questions, the first unique user record, and the first set of answers.

41. A system for evaluating compliance of a company against a set of regulatory requirements, said system comprising:
a non-transitory computer readable medium adapted to store in a relational database containing records and links defining a hierarchical structure of interconnections within the database a set of control documents, a set of questions linked by a first set of links in the relational database with one or more control documents from the set of control documents, and a set of default answers, each control document being an electronic record structured in a set of levels, wherein each level is linked by the first set of links in the relational database with one or more of the questions from the set of questions and one or more answers in the set of default answers, and further adapted to store in the relational database a master record, the master record comprising a nested set of records wherein each nested record in the nested set of records is associated with a subset of data in a separate data record and is linked with one level from the set of levels for each control document in the set of control documents by a second set of links in the relational database, each nested record in the set of nested records linked with a nested record in a higher nested layer and a nested record in a lower nested layer in the set of nested records, the master record adapted to, by a set of fields in the master record, link and facilitate management and tracking of the associations of the set of levels, the set of questions, and the set of default answers for each control document;

an assigning module adapted to automatically assign a first grouping of questions from the set of questions to a first unique user record based on a first set of information associated with the first unique user record;

a presentation module adapted to present the first grouping of questions via a display associated with the first user record;

a receiving module adapted to receive a first set of answers to the first grouping of questions, the first set of answers being associated with the first unique user record in response to the presenting;

a storing module adapted to store an indication of the assigned first grouping of questions and the receive first set of answers in a corresponding user record;

a comparing module adapted to generate an answer data structure comprising a sorted set of information derived in part by executing a set of queries on said relational database and to compare the answer data structure to a first grouping of default answers from the set of default answers and associated with the first grouping of questions;

a determining module adapted to determine a compliance level to the set of regulatory requirements based on the comparing step;

a generating module adapted to generate an audit report based at least in part on the compliance level; and a transmitting module adapted to transmit the audit report.

42. The system of claim 41 wherein the assigning module is further adapted to automatically assign a second grouping of questions from the set of questions to a second unique user record based on a set of information associated with the second unique user record.

43. The system as claimed in claim 41, further comprising:

a tracking module adapted to track any changes made to said compliance level; and the generating module further adapted to generate a new audit report identifying changes made to said compliance level.

44. The system as claimed in claim 41, further comprising a linking module adapted to automatically generate a link between two or more of the one or more control documents, the first grouping of questions, the first unique user record, and the first set of answers.

* * * * *